US011206505B2

(12) United States Patent
Hare

(10) Patent No.: US 11,206,505 B2
(45) Date of Patent: Dec. 21, 2021

(54) SYSTEMS AND METHODS FOR DYNAMICALLY LOADING AREA-BASED AUGMENTED REALITY CONTENT

(71) Applicant: Universal City Studios LLC, Universal City, CA (US)

(72) Inventor: Justin Allen Hare, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/418,682

(22) Filed: May 21, 2019

(65) Prior Publication Data

US 2020/0359160 A1 Nov. 12, 2020

Related U.S. Application Data

(60) Provisional application No. 62/843,968, filed on May 6, 2019.

(51) Int. Cl.
*G06F 16/9537* (2019.01)
*G06T 19/00* (2011.01)
*H04W 4/021* (2018.01)
*H04N 21/4335* (2011.01)

(52) U.S. Cl.
CPC ........ *H04W 4/021* (2013.01); *G06F 16/9537* (2019.01); *G06T 19/006* (2013.01); *H04N 21/4335* (2013.01)

(58) Field of Classification Search
CPC .................................................. G06T 19/006
See application file for complete search history.

(56) References Cited

U.S. PATENT DOCUMENTS

| 8,814,691 B2 | 8/2014 | Haddick et al. |
| 2011/0199479 A1 | 8/2011 | Waldman |
| 2012/0086727 A1 | 4/2012 | Korah et al. |

(Continued)

FOREIGN PATENT DOCUMENTS

WO 2016005799 1/2016

OTHER PUBLICATIONS

PCT/US2020/031268 International Search Report and Written Opinion dated Jul. 27, 2020.

*Primary Examiner* — Ryan McCulley
(74) *Attorney, Agent, or Firm* — Fletcher Yoder, P.C.

(57) ABSTRACT

An augmented reality device receives beacon signals within a geographical area from beacons that facilitate determining a distance between the device and a respective beacon. The device sends beacon-related signals indicative of the beacon signals to a server, which determines the area of the device. The server determines markers within the area of the device, and sends marker signals and augmented reality content associated with the markers to the device. The device scans the area and outputs content associated with a marker it identifies based on the marker signals. As the device enters subsequent areas, it receives additional beacon signals from additional beacons, sends additional beacon-related signals, and receives additional marker signals and content. If there is insufficient storage space on the device to store the additional marker signals and content, the device deletes previous marker signals and associated content. The device stores the additional marker signals and content.

20 Claims, 4 Drawing Sheets

(56) References Cited

U.S. PATENT DOCUMENTS

| | | | |
|---|---|---|---|
| 2012/0140040 A1* | 6/2012 | Sakurai | G06T 19/006 348/46 |
| 2012/0233025 A1* | 9/2012 | Calman | H04W 4/70 705/26.61 |
| 2013/0281207 A1 | 10/2013 | Lyons et al. | |
| 2014/0098132 A1* | 4/2014 | Fein | G06T 19/006 345/633 |
| 2014/0118398 A1* | 5/2014 | Hall | G06T 19/006 345/633 |
| 2014/0120887 A1* | 5/2014 | Huang | G06F 3/011 455/414.1 |
| 2015/0032838 A1 | 1/2015 | Demsey | |
| 2015/0046296 A1 | 2/2015 | Hart | |
| 2015/0347850 A1* | 12/2015 | Berelejis | G06F 3/04815 345/633 |
| 2016/0049013 A1* | 2/2016 | Tosas Bautista | G06T 19/006 345/633 |
| 2016/0086029 A1* | 3/2016 | Dubuque | G06K 9/00979 382/159 |
| 2016/0259404 A1 | 9/2016 | Woods | |
| 2016/0302037 A1 | 10/2016 | Jack et al. | |
| 2016/0323708 A1 | 11/2016 | Sahadi et al. | |
| 2017/0201709 A1* | 7/2017 | Igarashi | G06T 3/0068 |
| 2017/0232344 A1 | 8/2017 | Lim | |
| 2017/0243403 A1* | 8/2017 | Daniels | G06T 19/20 |
| 2017/0278486 A1* | 9/2017 | Ishikawa | G09G 5/00 |
| 2017/0323482 A1* | 11/2017 | Coup | H04N 13/366 |
| 2018/0005450 A1* | 1/2018 | Daniels | G06K 9/00671 |
| 2018/0374127 A1* | 12/2018 | Walden | G01G 19/4144 |
| 2019/0205078 A1* | 7/2019 | Sueki | A63F 13/323 |
| 2019/0206140 A1* | 7/2019 | Chen | H04L 67/18 |
| 2019/0304406 A1 | 10/2019 | Griswold et al. | |
| 2020/0074715 A1* | 3/2020 | Dixit | G06F 3/0346 |
| 2020/0111267 A1* | 4/2020 | Stauber | G06K 9/6211 |

\* cited by examiner

SYSTEMS AND METHODS FOR DYNAMICALLY LOADING AREA-BASED AUGMENTED REALITY CONTENT

CROSS REFERENCE TO RELATED APPLICATIONS

This application claims the benefit of U.S. Provisional Application Ser. No. 62/843,968, entitled "SYSTEMS AND METHODS FOR DYNAMICALLY LOADING AREA-BASED AUGMENTED REALITY CONTENT," filed May 6, 2019, which is hereby incorporated by reference in its entirety for all purposes.

BACKGROUND

The present disclosure relates generally to augmented reality and, more particularly, to dynamically loading area-based augmented reality content based on localization information (e.g., a set of spatial image or visual markers).

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

An augmented reality device may include, for example, headwear or eyewear that overlays a real-world environment with computer-generated content (e.g., images (including real-time rendered imagery and/or three-dimensional representations or objects), audio data, haptic data, and the like). The augmented reality device may identify a visual marker in the real environment using, for example, a camera, and output augmented reality content corresponding to the visual marker so that the desired augmented reality content is output at the intended space. However, due to the size of the visual markers and the augmented reality content, the augmented reality device may only be capable of storing visual markers and augmented reality content enough to provide an augmented reality experience for a limited space (e.g., an augmented reality experience for up to a couple of rooms of a house). It is now recognized that systems and methods for providing augmented reality in a larger or wider area are desirable.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In particular, in one embodiment, an augmented reality system includes beacons that send beacon signals to an augmented reality device located within a geographical area. The augmented reality system also includes an augmented reality content management server that receives beacon-related signals from the augmented reality device, determines a marker and augmented reality content associated with the marker based on part on the beacon-related signals, and sends a marker signal indicative of the marker and the augmented reality content to the augmented reality device. The marker (which may be one of a set of markers) is located within the geographical area and is identifiable by a camera of the augmented reality device. The augmented reality system further includes the augmented reality device communicatively coupled to the beacons and the augmented reality content management server. The augmented reality device includes the camera, a display, and a controller having a processor and a memory. The processor, when executing instructions stored on the memory, receives the beacon signals from the beacons, and sends the beacon-related signals to the augmented reality content server based on the beacon signals. The processor also receives the marker signal and the augmented reality content from the augmented reality content management server, scans the geographical area using the camera, identifies the marker within the geographical area; and outputs the augmented reality content on the display in response to identifying the marker.

In another embodiment, an augmented reality device includes a camera, a display, marker identification logic that identifies a marker within a geographical area using the camera, content output logic that outputs augmented reality content on the display, and a controller having a processor and a memory. The processor, when executing instructions stored on the memory, receives beacon signals from beacons within the geographical area, sends beacon-related signals to an augmented reality content management server based on the beacon signals, receives a marker signal indicative of the marker and the augmented reality content from the augmented reality content management server based on the beacon-related signals, instructs the marker identification logic to scan the geographical area, identifies the marker within the geographical area, and instructs the content output logic to output the augmented reality content on the display in response to identifying the marker.

In yet another embodiment, a tangible, non-transitory, computer-readable medium includes instructions for dynamically loading area-based augmented reality content. The instructions, when executed by a processor, cause the processor to receive a beacon signals from beacons within a geographical area, send beacon-related signals indicative of the beacon signals to an augmented reality content management server, receive marker signals indicative of markers within the geographical area and augmented reality content associated with the marker signals from the augmented reality content management server based on the beacon-related signals, scan the geographical area for the markers, and output augmented reality content associated with a marker in response to identifying the marker within the geographical area.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
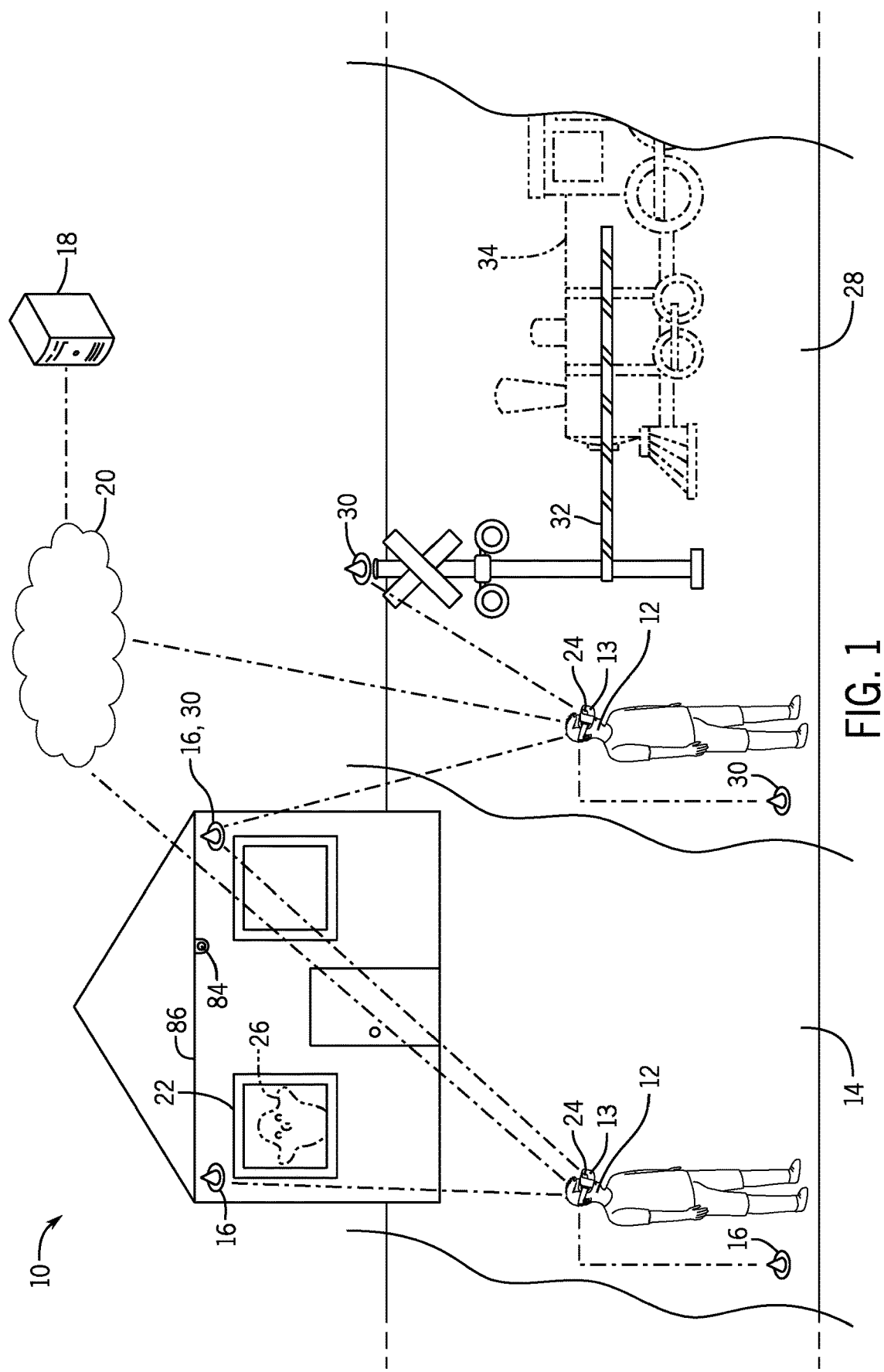
FIG. 1 is a perspective view of an augmented reality system, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to augmented reality and, more particularly, to dynamically loading area-based augmented reality content. Multiple beacons may be spread throughout a physical environment. An augmented reality device may receive beacon signals within a geographical area of the physical environment from beacons that facilitate determining a distance between the augmented reality device and a respective beacon. The augmented reality device may send beacon-related signals indicative of the beacon signals to an augmented reality content management server, which may determine the area of the augmented reality device based on the beacon-related signals. The augmented reality content management server may then determine markers at or near the area of the augmented reality device. The augmented reality content management server may send marker signals indicative of the markers and augmented reality content associated with the markers to the augmented reality device. The augmented reality device may scan the area and, in response to identifying a marker based on the marker signals, output the augmented reality content associated with the marker.

As the augmented reality device enters subsequent geographical areas of the physical environment, it may receive additional beacon signals from beacons at the subsequent geographical areas, send additional beacon-related signals based on the additional beacon signals, and receive additional marker signals and augmented reality content based on the additional beacon-related signals. If there is insufficient storage space on the augmented reality device (e.g., in the form of volatile memory, such as random access memory (RAM), nonvolatile memory, such as flash memory, or a combination of the two), to store the additional marker signals and augmented reality content, the augmented reality device may delete previous marker signals and associated augmented reality content. The augmented reality device may then store the additional marker signals and augmented reality content. For example, the augmented reality device may delete the oldest stored marker signals and augmented reality content or the stored marker signals and augmented reality content associated with a geographical area of the physical environment that is furthest away from the current area of the augmented reality device. The augmented reality device may then scan a current area for markers associated with the additional marker signals, and output the additional augmented reality content. As such, the augmented reality device may continually store marker signals and augmented reality content associated with the current area of the augmented reality device, scan for relevant markers associated with the newly uploaded marker signals, and output the appropriate and newly uploaded augmented reality content. In this manner, area-based augmented reality content may be dynamically loaded and provided, even for large or wider areas with augmented reality content for which an augmented reality device may typically not have sufficient storage space to store.

As an introduction, FIG. 1 is a perspective view of an augmented reality system 10, according to an embodiment of the present disclosure. The augmented reality system 10 includes an augmented reality device 12 that may be any suitable electronic device that overlays a real-world environment with computer-generated content (e.g., images, audio data, haptic data, and the like) or augmented reality content. For example, the augmented reality device 12 may include a display 13 that enables a user to view the real world environment while overlaying images over the view. As such, the augmented reality device 12 may include eyeglasses, a headset, a head-up display, contact lenses, a virtual retinal display, an EyeTap, a handheld display, a spatial augmented reality system, googles, and so on. In some embodiments, the augmented reality device 12 may include the user's smartphone or mobile communication device. The user may hold up their smartphone which may use its camera to show the real-world environment and display the augmented reality content on top of the displayed real-world environment. In some cases, the smartphone may be mounted to the headset or goggles to enable the user to enjoy the augmented reality environment without having to use their hands to hold up the smartphone. In alternative or additional embodiments, the augmented reality device 12 may include audio output components (e.g., speakers, headphones, earphones, and the like) and/or haptic output components (e.g., vibrational components, motion-generating components, gloves, and the like).

As illustrated, the user operates the augmented reality device 12 in a first geographical area or location 14 (e.g., of a theme park or entertainment venue). In the first geographical area 14, the augmented reality system 10 may include one or more beacons 16. The beacons 16 may facilitate determining the geographical area of the augmented reality device 12. In particular, each beacon 16 may send a beacon signal to the augmented reality device 12 which may provide an indication of the distance between the beacon 16 and the augmented reality device 12. The beacon signal may be sent to the augmented reality device 12 using any suitable communication protocol, such as Bluetooth, WiFi, infrared, Ethernet, Thread, ZigBee, Z-Wave, KNX, mobile, and so on.

The geographical area may include, for example, an extent or measurement of a location (e.g., a 20 foot radius of the location), one or more rooms of a building, one or more stories or levels of the building, a portion of one or more rooms and/or one or more stories or levels of the building, and so on.

In some embodiments, the beacon signal may include a timestamp (e.g., of when the beacon 16 sent the beacon signal), and the distance between the beacon 16 and the augmented reality device 12 may be determined (e.g., by the augmented reality device 12) based on the timestamp and a known or predetermined speed of the beacon signal. In some cases, a single beacon 16 may be used to determine an approximate geographical area of the augmented reality device 12 (e.g., within a radius of the beacon 16). In other cases, multiple beacons 16 may be used to more precisely determine the geographical area of the augmented reality device 12 (e.g., via triangulation or other location determining techniques).

The beacon signal may also or alternatively include an identifier, such as an area identifier (e.g., associated with the first geographical area 14). As such, the beacon signal may enable the augmented reality device 12 to determine the area the augmented reality device 12 is located in based on the area identifier. In some embodiments, the beacon signal may include the timestamp, a version code, and/or checksum to indicate a current associated mapping set, enabling the augmented reality device 12 to determine whether the current mapping set associated with the beacon signal is up to date. For instance, each mapping set may include an expiration timestamp for the augmented reality device 12 to compare the timestamp, version code, and/or checksum to. If the augmented reality device 12 determines that the beacon signal's associated mapping set is out of date, the augmented reality device 12 may re-query for an up to date mapping set. Moreover, while the beacons 16 shown in FIG. 1 are illustrated as outside, the beacons 16 may also be disposed inside a building (e.g., one or more beacons 16 in each room of the building), in different floors of a building, and so on. In additional or alternative embodiments, the use of beacons 16 may be supplemented with any other suitable location determining technique, such as a global position system (GPS), WiFi mapping, cellular signal triangulation, and so on, to, for example, reduce the number of beacons 16 used to determine the geographical area of the augmented reality device 12.

The augmented reality device 12 may be communicatively coupled to an augmented reality content management server 18, via, for example, a communication network 20. In some embodiments, the augmented reality device 12 may send the beacon signals sent by the beacons 16 or beacon-related signals that are indicative of the beacon signals to the augmented reality content management server 18. The beacon-related signals may be generated by the augmented reality device 12 to include information of the beacon signals associated with locating the augmented reality device 12. In some embodiments, the beacon-related signals may include a combination of at least a portion of the beacon signals. The augmented reality content management server 18 may then determine the geographical area of the augmented reality device 12. In alternative or additional embodiments, the augmented reality device 12 may determine the area based on the beacon signals, and then send a location signal indicative of the geographical area to the augmented reality content management server 18. The augmented reality content management server 18 may store, access, or retrieve marker information and augmented reality content associated with the marker information, that correspond to the determined area of the augmented reality device 12. The augmented reality content management server 18 may then send the marker information (e.g., as marker signals) and the associated augmented reality content to the augmented reality device 12.

The marker information may include any suitable information used to identify, describe, or be indicative of a spatial image or visual marker or tag 22 within the geographical area of the augmented reality device 12. For example, the marker information may include image recognition information, barcode or Quick Response (QR) code information, and so on. The marker or tag 22 may include any suitable identifier that enables the augmented reality device 12 to recognize the marker 22. For example, the marker 22 may include a visual identifier, such as a poster, a graphic, a design, a shape, a shape of a wall or ceiling, a pattern on a wall or ceiling, a barcode, a QR code, and so on. A camera 24 of the augmented reality device 12 may scan the area and identify the marker 22 using the marker information. In response to identifying the marker 22, the augmented reality device 12 may output augmented reality content 26 associated with the marker. The augmented reality content 26 may include any suitable content that the augmented reality device 12 may output, such as image content, audio content, haptic content (e.g., vibrational content), and the like. For example, the augmented reality content may include creatures flying around (e.g., interacting with scenery and/or guests), locations of where water pipes are buried or electrical wiring are located in walls for maintenance purposes, and so on.

As illustrated in FIG. 1, when the augmented reality device 12 is within the first geographical area 14, the marker information sent by augmented reality content management server 18 is indicative of the marker 22, which is a window frame. The augmented reality content management server 18 also sends the augmented reality content 26 associated with the marker 22, which is illustrated as a ghost (in dashed lines). As the user looks around the first geographical area 14, the camera 24 scans the first geographical area 14, and identifies the marker 22 (e.g., the window frame). The augmented reality device 12 outputs (e.g., displays) the augmented reality content 26 (e.g., the ghost) associated with the marker 22.

The augmented reality device 12 may store the marker information (associated with the marker 22) and the associated augmented reality content 26. As such, during a subsequent viewing of the marker 22 (e.g., the window frame) by the augmented reality device 12, the augmented reality device 12 may once again output the augmented reality content 26 (e.g., the ghost), but without having to download the marker information and associated augmented reality content 26 from the augmented reality content management server 18.

FIG. 1 also illustrates a second geographical area or location 28. The second area 28 may also include one or more beacons 30. In some cases, one or more of the beacons 30 within the second geographical area 28 may be shared with one or more of the beacons 16 of the first geographical area 14. In other cases, the beacons 30 within the second area 28 may not include any of the beacons 16 within the first geographical area 14. Each beacon 30 may send a beacon signal to the augmented reality device 12 which may provide an indication of the distance between the beacon 30 and the augmented reality device 12. The augmented reality device 12 may send beacon-related signals to the augmented reality content management server 18 that are indicative of the beacon signals sent by the beacons 16. The augmented reality content management server 18 may then determine the area of the augmented reality device 12 (e.g., the second geographical area 28). In alternative or additional embodiments, the augmented reality device 12 may determine the area based on the beacon signals, and then send a location signal indicative of the area to the augmented reality content management server 18.

The augmented reality content management server 18 may send marker information associated with the second geographical area 28 and the augmented reality content 26 associated with the marker information to the augmented reality device 12. As illustrated, when the augmented reality device 12 is within the second geographical area 28, the marker information sent by augmented reality content management server 18 is indicative of the marker 32, which is a railroad crossing gate. The augmented reality content management server 18 also sends an augmented reality content 34 associated with the marker 32, which is illustrated as a train (in dashed lines). As the user looks around the second geographical area 28, the camera 24 scans the second geographical area 28, and identifies the marker 32 (e.g., the railroad crossing gate). The augmented reality device 12 outputs (e.g., displays) the augmented reality content 34 (e.g., the train) associated with the marker 32. While only one marker (e.g., 22, 32) is illustrated within each area (e.g., 14, 28) of FIG. 1, it should be understood that each geographical area may include any suitable number of markers (e.g., 1-1000 markers, 1-100 markers, 1-10 markers, and so on).

The augmented reality device 12 may store the marker information (associated with the marker 32) and the associated augmented reality content 34. Because the augmented reality device 12 has finite storage space, previously stored information may be deleted to make room for the marker information (associated with the marker 32) and the associated augmented reality content 34. The augmented reality device 12 may use any suitable algorithm to determine what previously stored information should be deleted. For example, the augmented reality device 12 may delete the oldest stored marker information and associated augmented reality content. As another example, the augmented reality device 12 may delete marker information and associated augmented reality content corresponding to a geographical area or location that is furthest away from the current area of the augmented reality device. As yet another example, the augmented reality device 12 may delete marker information and associated augmented reality content that is the least frequently used, as it may be unlikely that the user is returning to the corresponding area. In any case, with the previously stored data deleted, the augmented reality device 12 may store the marker information (associated with the marker 32) and the associated augmented reality content 34, and, during a subsequent viewing of the marker 32 (e.g., the railroad crossing gate) by the augmented reality device 12, the augmented reality device 12 may once again output the augmented reality content 34 (e.g., the train), without having to download the marker information and associated augmented reality content 26 from the augmented reality content management server 18.

In alternative or additional embodiments, the augmented reality device 12 may initially store the previously stored information in a first (e.g., volatile memory device) memory, such as RAM, and when the augmented reality device 12 determines that there is insufficient storage space in the first memory to store new marker information and/or associated augmented reality content 34, the augmented reality device 12 may move the previously stored information to a second (e.g., nonvolatile memory device) memory, such as a hard drive or flash memory device. In such embodiments, the new marker information and/or associated augmented reality content 34 may then be quickly loaded from the first (e.g., volatile memory device) memory. If the augmented reality device 12 returns to the initial location associated with the previously stored information, the augmented reality device 12 may then quickly reload the previously stored information from the second memory into the first memory, rather than downloading from the content augmented reality content management server 18 again.

Figure 2:
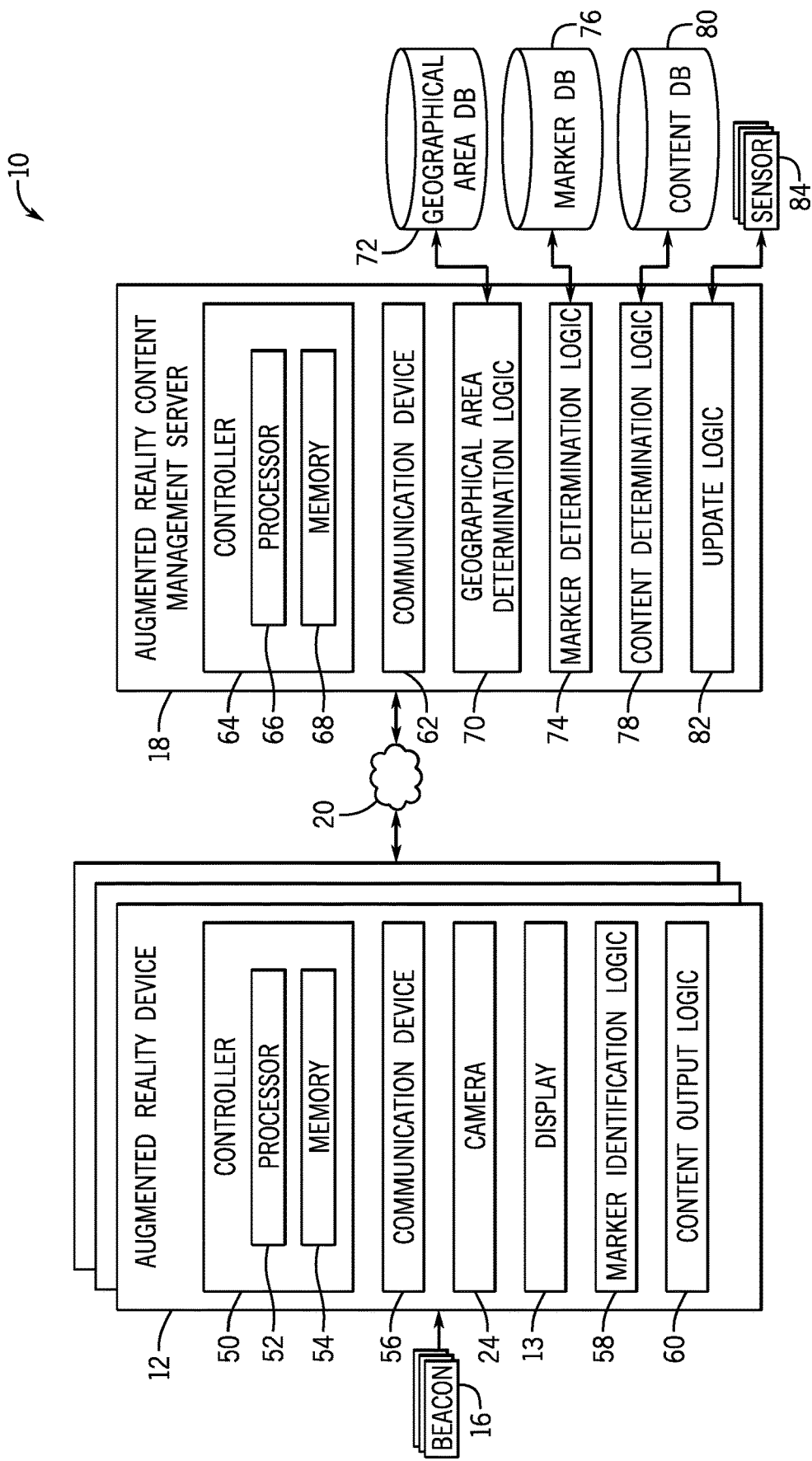
FIG. 2 is a block diagram of the augmented reality system of FIG. 1, according to an embodiment of the present disclosure.

With the foregoing in mind, FIG. 2 is a block diagram of the augmented reality system 10 of FIG. 1, according to an embodiment of the present disclosure. The augmented reality device 12 may include a controller 50 having one or more processors (illustrated as a single processor 52) and one or more memory or storage devices (illustrated as a single memory device 54). The processor 52 may execute software programs and/or instructions stored in the memory device 54 that facilitate dynamically loading area-based augmented reality content. Moreover, the processor 52 may include multiple microprocessors, one or more "general-purpose" microprocessors, one or more special-purpose microprocessors, and/or one or more application specific integrated circuits (ASICS). For example, the processor 52 may include one or more reduced instruction set (RISC) processors. The memory device 54 may store information such as control software, look up tables, configuration data, and so forth. The memory device 54 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium. The memory device 54 may store a variety of information and may be used for various purposes.

The augmented reality device 12 may include a communication device 56 that may enable the controller 50 to communicate with any suitable communication network 20. For example, the communication network 20 may include a local area network, a metropolitan area network, a wide area network, a wireless network, and/or an inter network or Internet. As such, the communication device 56 may use any suitable communication protocol to communicate with the network 20, such as WiFi, infrared, Ethernet, Bluetooth, Thread, ZigBee, Z-Wave, KNX, mobile, and so on.

The augmented reality device 12 also includes the camera 24 (which may be part of a set of multiple cameras of the augmented reality device 12), which may be any suitable image capture or scanning device. The camera 24 may be used to facilitate outputting augmented reality content (e.g., 26) and scan areas (e.g., 14) for markers (e.g., 22). The augmented reality device 12 may also include the display 13, which may enable the user to view the real world environment while overlaying the augmented reality content over the view.

The augmented reality device 12 may also include marker identification logic 58 that facilitates identifying the marker (e.g., 22) within an area (e.g., 14). In particular, the marker identification logic 58 may receive marker information from the augmented reality content management server 18 (e.g., via the communication device 56 over the communication network 20) corresponding to the marker, receive one or more images of the area from the camera 24, and determine the geographical area of the marker in the one or more images based on the marker information.

The augmented reality device 12 may also include content output logic 60 that facilitates outputting augmented reality content (e.g., 26) onto, for example, the display 13 of the augmented reality device 12. In particular, the content output logic 60 may receive the augmented reality content from the augmented reality content management server 18 (e.g., via the communication device 56 over the communication network 20) associated with the marker (e.g., 22), receive one or more images of an area (e.g., 14) from the camera 24, an indication of the area of the marker in the one or more images (e.g., from the marker identification logic 58), and output (e.g., display) the augmented reality content on the augmented reality device 12 (e.g., on the display 13).

The term "logic" as used in the present disclosure may include hardware (e.g., circuitry), software (e.g., machine-readable instructions), or a combination of the two. Additionally, even though FIG. 2 illustrates the marker identification logic 58 and/or the content output logic 60 as separate from other components of the augmented reality device 12, it is contemplated that the marker identification logic 58 and/or the content output logic 60 may be part of other components of the augmented reality device 12, such as part of and/or stored in the controller 50, the processor 52, and/or the memory device 54, and/or part of the augmented reality content management server 18.

The communication device 56 may enable the augmented reality device 12 to communicate with the augmented reality content management server 18 via the communication network 20 and a communication device 62 of the augmented reality content management server 18. The communication device 62 may use any suitable communication protocol to communicate with the network 20, such as WiFi, infrared, Ethernet, Bluetooth, Thread, ZigBee, Z-Wave, KNX, mobile, and so on.

The augmented reality content management server 18 may also include a controller 64 having one or more processors (illustrated as a single processor 66) and one or more memory or storage devices (illustrated as a single memory device 68). The processor 66 may execute software programs and/or instructions stored in the memory device 68 that facilitate managing marker information and/or augmented reality content. Moreover, the processor 66 may include multiple microprocessors, one or more "general-purpose" microprocessors, one or more special-purpose microprocessors, and/or one or more ASICS. For example, the processor 66 may include one or more RISC processors. The memory device 68 may store information such as control software, look up tables, configuration data, and so forth. The memory device 68 may include a tangible, non-transitory, machine-readable-medium, such as volatile memory (e.g., RAM, nonvolatile memory (e.g., ROM), flash memory, one or more hard drives, and/or any other suitable optical, magnetic, or solid-state storage medium. The memory device 68 may store a variety of information and may be used for various purposes.

The augmented reality content management server 18 may include geographical area determination logic 70 that facilitates determining the geographical area or location based on receiving beacon-related signals. In particular, the geographical area determination logic 70 may be communicatively coupled to a geographical area database 72 that stores information relating areas to beacons. The geographical area database 72 may also store a map of where the areas and/or beacons are located. In such cases, the augmented reality content management server 18 may determine the geographical area of the augmented reality device 12 and distances to other areas. As such, the augmented reality content management server 18 may determine areas which the augmented reality device 12 is farthest away from. The augmented reality content management server 18 may delete mark information and associated augmented reality content from the memory device 54 to create storage space to store new mark information and associated augmented reality content.

In alternative or additional embodiments, the geographical area database 72 may be in the form of a table or any other suitable format that relates areas to beacons. As such, the geographical area determination logic 70 may receive one or more beacon-related signals from the augmented reality device 12, and determine the geographical area using the geographical area database 72 based on the beacon-related signals. For example, the geographical area database 72 may include information that relates the first geographical area 14 to a first set of beacons 16. The geographical area determination logic 70 may receive beacon-related signals from the augmented reality device 12 that were generated based on receiving beacon signals from beacons 16, and determine that the augmented reality device 12 is located within the first area 14 using the geographical area database 72 based on the beacon-related signals associated with the beacons 16. In some embodiments, the augmented reality device 12 may include the geographical area determination logic 70, which may determine the area of the augmented reality device 12 using the geographical area database 72 based on receiving the beacon signals, and send the area to the augmented reality content management server 18.

The augmented reality content management server 18 may include marker determination logic 74 that facilitates determining markers that are within the geographical area or location. In particular, the marker determination logic 74 may be communicatively coupled to a marker database 76 that stores information relating markers to areas. In alternative or additional embodiments, the marker database 76 may be in the form of a table or any other suitable format that relates markers to areas. As such, the marker determination logic 74 may receive an indication of an area (e.g., from the geographical area determination logic 70) and determine one or more markers that are in the area using the marker database 76 based on the indication. For example, the marker database 76 may include information that relates the marker 22 (e.g., the window frame) to the first area 14. The marker determination logic 74 may receive an indication of the first geographical area 14 from the geographical area determination logic 70, and determine the marker 22 that is disposed within the first geographical area 14 using the marker database 76 based on the indication.

The augmented reality content management server 18 may also include content determination logic 78 that facilitates determining augmented reality content to be output corresponding to a marker. In particular, the content determination logic 78 may be communicatively coupled to a content database 80 that stores information relating augmented reality content to markers. The content database 80 may also store the augmented reality content, such as image, video, audio, and/or haptic data associated with enabling the user to experience a creature flying overhead. In alternative or additional embodiments, the content database 80 may be in the form of a table or any other suitable format that relates augmented reality content to markers. As such, the content determination logic 78 may receive an indication of the marker (e.g., from the marker determination logic 74) and determine augmented reality content that is associated with (e.g., that should be output in relation to) the marker using the content database 80 based on the indication. For example, the content database 80 may include information that relates the augmented reality content 26 (e.g., the ghost) to the marker 22 (e.g., the window frame). The content determination logic 78 may receive an indication of the marker 22 from the marker determination logic 74, and determine the augmented reality content 26 that is associated with the marker 22 based on the indication. In some cases, the content determination logic 78 may also determine positioning information of the augmented reality content (e.g., information associated with where and/or how to output or display the augmented reality content relative, for example, to the marker).

The augmented reality content management server 18 may then send an indication of the marker and the associated augmented reality content to the augmented reality device 12, which may scan for the marker based on the indication using the marker identification logic 58, and, when the marker is identified, output (e.g., display) the augmented reality content (e.g., on the display 13) using the content output logic 60. In cases where there are multiple markers within the area where the augmented reality device 12 is located, the augmented reality content management server 18 may associate respective augmented reality content with a respective marker (e.g., by providing an indication of that the respective augmented reality content is associated with the respective marker). In this manner, the system 10 may dynamically load area-based augmented reality content 26.

The augmented reality content management server 18 may include update logic 82 that facilitates updating the geographical area database 72, the marker database 76, and/or the content database 80. For example, the update logic 82 may update the geographical area database 72 as beacons are added, removed, or modified from different geographical areas. As such, the geographical area database 72 may be made current as to relating areas to beacons.

The update logic 82 may also update the marker database 76 as markers are added, removed, or modified. For example, a marker for which associated augmented reality content is output may include a poster on a wall, which may be removed. A new marker may be added or identified for the associated augmented reality content to be output, and thus updated in the marker database 76 by the update logic 82. As illustrated, the update logic 82 may be communicatively coupled to one or more sensors 84 that may determine whether a marker is added, removed, or modified. In particular, a sensor 84 may include a camera that has a view of an area (e.g., 14) where the marker (e.g., 22) is located. The sensor 84 may include cameras (e.g., security camera) that are stationed or fixed in or within viewing distance of the area, cameras that are manually operated by employees maintaining or managing the area (e.g., theme park employees), and/or cameras of augmented reality devices 24 or mobile communication devices (e.g., smartphones) of users (e.g., theme park patrons). The update logic 82 may use the sensor 84 to determine that a marker has been removed, and use the sensor 84 to determine a replacement marker. The replacement marker may be any suitable marker that may be used to determine where and how to output the associated augmented reality content. Using FIG. 1 as an example, if the window frame marker 22 is removed, then the update logic 82 may use the sensor 84 (e.g., a security camera) to determine that the window frame marker 22 has been removed, and determine that a roofline 86 should be used as a replacement marker. The update logic 82 may update the marker database 76 to replace the window frame marker 22 with the roofline marker 86, and the content database 80 to associate the augmented reality content 26 (e.g., the ghost) with the roofline marker 86 (instead of the previously associated window frame marker 22). As such, the marker database 76 may be made current as to markers within the geographical areas, and the content database 80 may be made current as to relationships between augmented reality content and markers. Additionally, the marker database 76 may be initially setup by having stationed or fixed cameras (e.g., 84) and/or employees manually using cameras such as cameras (e.g., 24) of augmented reality devices 12 and/or smartphones to pre-scan areas to capture the marker (e.g., 22) and marker locations (e.g., when theme park patrons are not present). In some cases, this pre-scan procedure may be repeated periodically (e.g., daily, weekly, or monthly) before or after there is traffic in the areas (e.g., before the theme park opens or after the theme park closes).

The update logic 82 may also update the content database 80 as augmented reality content is added, removed, or modified. As such, the content database 80 may be made current as to relating augmented reality content to markers. In some embodiments, the update logic 82 may update the geographical area database 72, the marker database 76, and/or the content database 80 as areas, markers, and/or augmented reality content are added, removed, and/or modified. In alternative or additional embodiments, the update logic 82 may update the geographical area database 72, the marker database 76, and/or the content database 80 periodically (e.g., hourly, daily, weekly, or the like).

Figure 3:
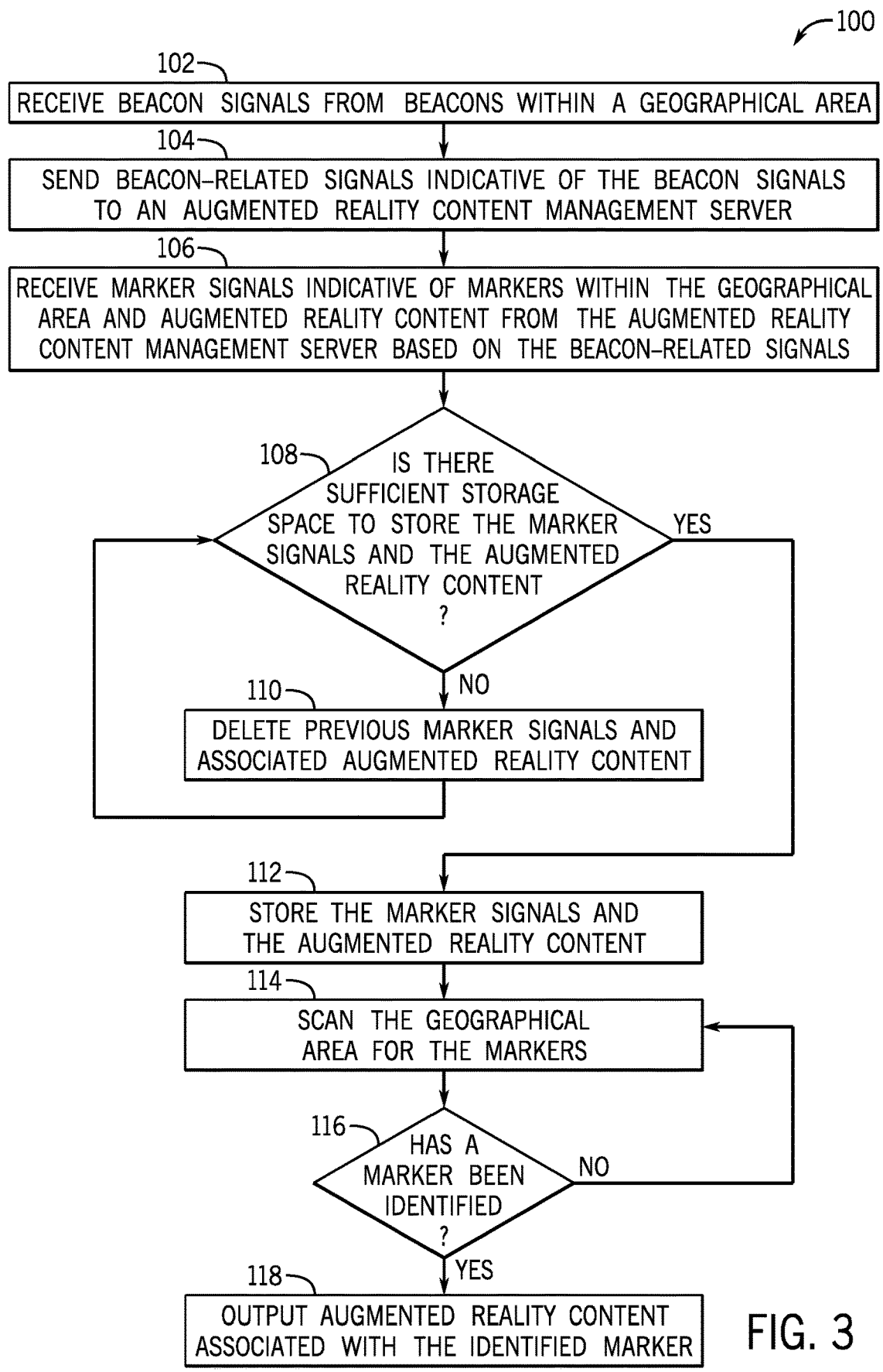
FIG. 3 is a flowchart illustrating a method for dynamically loading area-based augmented reality content, according to an embodiment of the present disclosure.

FIG. 3 is a flowchart illustrating a method 100 for dynamically loading area-based augmented reality content, according to an embodiment of the present disclosure. The method 100 may be performed by any suitable device that may dynamically load area-based augmented reality content, such as the processor 52. While the method 100 is described using steps in a specific sequence, it should be understood that the present disclosure contemplates that the described steps may be performed in different sequences than the sequence illustrated, and certain described steps may be skipped or not performed altogether. In some embodiments, the method 100 may be implemented by executing instructions stored in a tangible, non-transitory, computer-readable medium, such as the memory device 54, using a processor, such as the processor 52.

As illustrated, in process block 102, the processor 52 receives beacon signals within a geographical area. Referring back to FIG. 1, the processor 52 may be part of the augmented reality device 12, and receive the beacon signals from beacons 16 within the first geographical area 14. In process block 104, the processor 52 sends beacon-related signals indicative of the beacon signals to an augmented reality content management server 18. In some embodiments, the processor 52 may instead send the beacon signals themselves (rather than the beacon-related signals derived from the beacon signals) to the augmented reality content management server 18.

In process block 106, the processor 52 receives marker signals indicative of markers at the geographical area and augmented reality content from the augmented reality content management server 18 based on the beacon-related signals. In particular, based on receiving the beacon-related signals, the augmented reality content management server 18 may determine the geographical area (e.g., the first area 14) of the augmented reality device 12 using the geographical area determination logic 70 and the geographical area database 72. The augmented reality content management server 18 may then determine markers (e.g., the marker 22) in the area using the marker determination logic 74 and the marker database 76 based on the area. The augmented reality content management server 18 may further determine augmented reality content (e.g., the ghost 26) associated with the markers using the content determination logic 78 and the content database 80 based on the markers. The augmented reality content management server 18 may send marker signals (e.g., indicative of the markers) and the associated augmented reality content to the augmented reality device 12.

In decision block 108, the processor 52 determines whether there is sufficient storage space to store the marker signals and the associated augmented reality content. For example, the processor 52 may determine whether there is sufficient space in the memory device 54. If not, in process block 110, the processor 52 deletes previous marker signals and/or associated augmented reality content. The processor 52 may use any suitable algorithm to determine what previous marker signals and/or associated augmented reality content should be deleted. For example, the augmented reality device 12 may delete the oldest stored marker information and associated augmented reality content. As another example, the augmented reality device 12 may delete marker information and associated augmented reality content corresponding to a geographical area or location that is furthest away from the current area or location of the augmented reality device. As yet another example, the augmented reality device 12 may delete marker information and associated augmented reality content that is the least frequently used, as it may be unlikely that the user is returning to the corresponding area. The processor 52 then returns to decision block 108 to determine if, after deleting the previous marker signals and/or the associated augmented reality content, there is sufficient storage space to store the marker signals and the associated augmented reality content.

In process block 112, the processor 52 stores the marker signals and the associated augmented reality content. For example, the processor may store the marker signals and the associated augmented reality content in the memory device 54.

In process block 114, the processor 52 scans the area for the markers associated with the marker signals. For example, in FIG. 1, the processor 52 may instruct the camera 24 of the augmented reality device 12 to scan the first area 14 for the marker 22 (e.g., the window frame).

In decision block 116, the processor 52 determines whether a marker has been identified. If not, the processor 52, in process block 114, continues to scan the area for the markers. Once the marker has been identified, in process block 118, the processor 52 outputs the augmented reality content associated with the identified marker. Referring back to FIG. 1, as the user looks around the first area 14, the processor 52 uses the camera 24 to scan the first area 14, identifies the marker 22 in the form of the window frame, and outputs the augmented reality content 26 to the display 13 of the augmented reality device 12 in the form of a ghost. In some embodiments, the processor 52 receives positioning information along with the marker signal and the augmented reality content that indicates where or how to output the augmented reality content. For example, in FIG. 1, the processor 52 may receive positioning information along with the marker signal indicative of the marker 22 and the augmented reality content 26 to display the augmented reality content 26 (e.g., the ghost) within the marker 22 (e.g., the window frame) on the augmented reality device 12. In this manner, the method 100 may dynamically load area-based augmented reality content 26.

Figure 4:
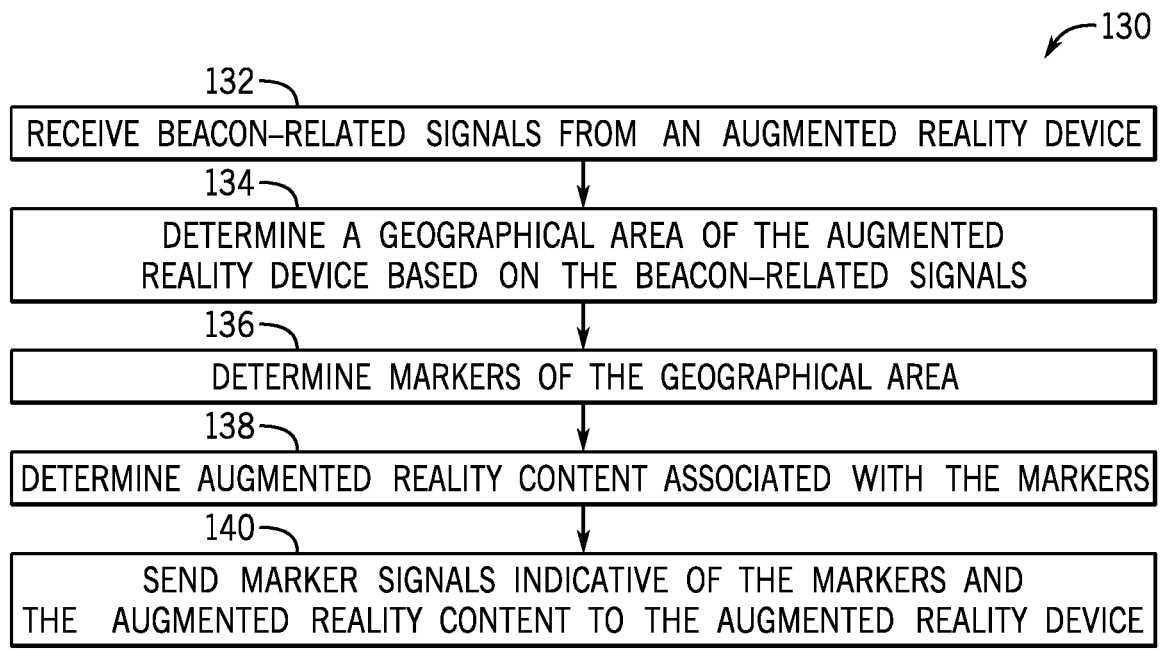
FIG. 4 is a flowchart illustrating a method for the augmented reality content management server of FIG. 2 to facilitate dynamically loading area-based augmented reality content, according to an embodiment of the present disclosure.

FIG. 4 is a flowchart illustrating a method 130 for the augmented reality content management server 18 of FIG. 2 to facilitate dynamically loading area-based augmented reality content, according to an embodiment of the present disclosure. The method 130 may be performed by any suitable device that may facilitate dynamically load area-based augmented reality content, such as the processor 66 of the augmented reality content management server 18. While the method 130 is described using steps in a specific sequence, it should be understood that the present disclosure contemplates that the described steps may be performed in different sequences than the sequence illustrated, and certain described steps may be skipped or not performed altogether. In some embodiments, the method 130 may be implemented by executing instructions stored in a tangible, non-transitory, computer-readable medium, such as the memory device 68, using a processor, such as the processor 66.

As illustrated, in process block 132, the processor 62 receives beacon-related signals from an augmented reality device 12. In particular, the beacon-related signals may be indicative of beacon signals sent by beacons and received by the augmented reality device 12. In some embodiments, the processor 62 may instead receive the beacon signals themselves (rather than the beacon-related signals derived from the beacon signals) from the augmented reality device 12.

In process block 134, the processor 62 determines a geographical area of the augmented reality device 12 based on the beacon-related signals. In particular, the augmented reality content management server 18 may use the geographical area determination logic 70 to determine the area of the augmented reality device 12 based on the beacon-related signals and the geographical area database 72 (which stores information relating areas to beacons).

In process block 136, the processor 62 determines markers at the area. In particular, the augmented reality content management server 18 may use the marker determination logic 74 to determine the markers within the area of the augmented reality device 12 based on the markers determined in process block 134 and the marker database 76 (which stores information relating markers to areas).

In process block 138, the processor 62 determines augmented reality content associated with the markers. In particular, the augmented reality content management server 18 may use the content determination logic 78 to determine the augmented reality content associated with the markers determined in process block 134 and the content database 80 (which stores information relating augmented reality content to markers).

In process block 140, the processor 62 then sends marker signals indicative of the markers determined in process block 134 and the associated augmented reality content determined in process block 138 to the augmented reality device 12. In this manner, the method 130 may enable the augmented reality content management server 18 to facilitate dynamically loading area-based augmented reality content.

Figure 5:
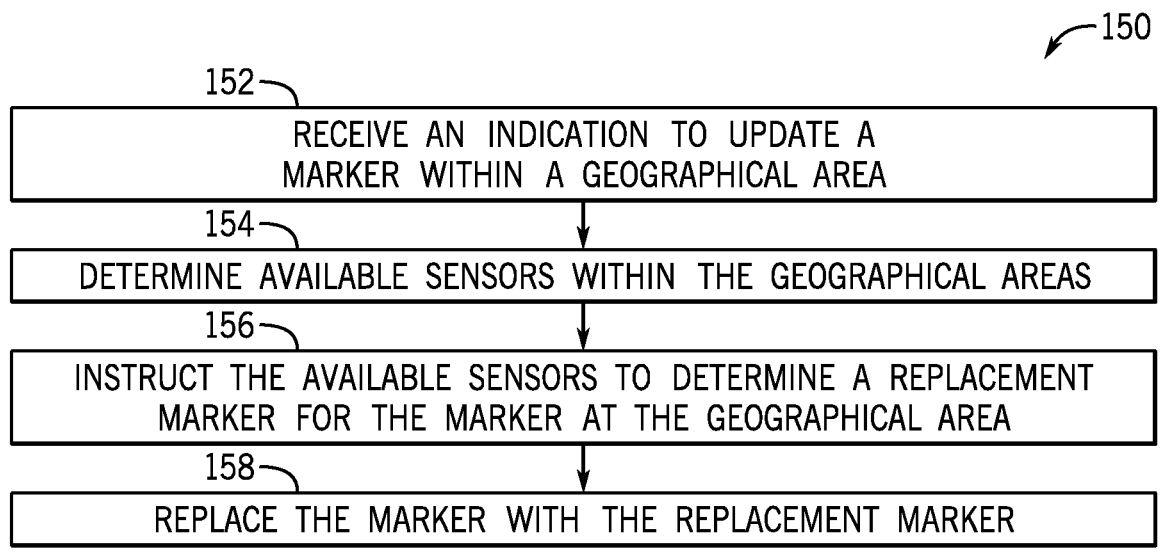
FIG. 5 is a flowchart illustrating a method for the augmented reality content management server of FIG. 2 to update a marker, according to an embodiment of the present disclosure.

FIG. 5 is a flowchart illustrating a method 150 for the augmented reality content management server 18 of FIG. 2 to update a marker (e.g., 22), according to an embodiment of the present disclosure. The method 150 may be performed by any suitable device that may update a marker, such as the update logic 82 and/or the processor 66 of the augmented reality content management server 18. While the method 150 is described using steps in a specific sequence, it should be understood that the present disclosure contemplates that the described steps may be performed in different sequences than the sequence illustrated, and certain described steps may be skipped or not performed altogether. In some embodiments, the method 150 may be implemented by executing instructions stored in a tangible, non-transitory, computer-readable medium, such as the memory device 68, using a processor, such as the processor 66.

As illustrated, in process block 152, the update logic 82 receives an indication to update a marker within a geographical area. The indication may be received as part of an asynchronous operation (e.g., triggered because the marker has been added, removed, or modified) or as part of a synchronous operation (e.g., triggered due to a periodic update of markers within the area). As an example, referring back to FIG. 1, the update logic 82 may receive an indication to update the marker 22 (e.g., the window frame) within the first area 14 because, for example, the marker 22 has been removed.

In process block 154, the update logic 82 determines available sensors within the geographical area. Referring back to FIG. 1, the update logic 82 may determine that the sensor 84 (e.g., a security camera) is an available sensor within the first area 14. Similarly, the update logic 82 may determine that the camera 24 of the augmented reality device 12 is an available sensor within the first area 14.

In process block 156, the update logic 82 instructs the available sensors to determine or capture a replacement marker for the marker within the geographical area. The replacement marker may be any suitable marker that may be used to determine where and how to output the associated augmented reality content. Again, using FIG. 1 as an example, if the window frame marker 22 has been removed, then the update logic 82 may use the security camera sensor 84 to determine that the roofline 86 should be used as a replacement marker.

In process block 158, the update logic 82 replaces the marker with the replacement marker. In particular, the update logic 82 may update the marker database 76 to replace the previous marker with the replacement marker, and the content database 80 to associate the augmented reality content previously associated with the previous marker with the replacement marker. As such, the marker database 76 may be made current as to markers within the areas, and the content database 80 may be made current as to relationships between augmented reality content and markers. Using the previous example, the update logic 82 may update the marker database 76 to replace the window frame marker 22 with the roofline marker 86, and the content database 80 to associate the augmented reality content 26 (e.g., the ghost) with the roofline marker 86 (instead of the previously associated window frame marker 22). In this manner, the method 150 may enable the augmented reality content management server 18 to update a marker as the marker is added, removed, or modified.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. An augmented reality system comprising:
an augmented reality device comprising a camera, a display and a controller, wherein the augmented reality device is located within a geographical area;
one or more beacons configured to send one or more beacon signals to the augmented reality device located within the geographical area; and
an augmented reality content management server configured to:
receive one or more beacon-related signals from the augmented reality device;
determine a marker and augmented reality content associated with the marker based at least in part on the one or more beacon-related signals, wherein the marker is located within the geographical area and is configured to be identifiable by the camera of the augmented reality device, and wherein the augmented reality content is associated with an amusement park attraction;
receive an indication to update the marker;
in response to receiving the indication to update the marker, select a replacement marker from a plurality of markers in the geographical area without user interaction; and
send a marker signal indicative of the replacement marker and the augmented reality content to the augmented reality device;
wherein the augmented reality device is configured to be communicatively coupled to the one or more beacons and the augmented reality content management server; and
wherein the controller of the augmented reality device comprises one or more processors and one or more memory devices, wherein the one or more processors, when executing instructions stored on the one or more memory devices, are configured to:
receive the one or more beacon signals from the one or more beacons, and send the one or more beacon-related signals to the augmented reality content management server based at least in part on the one or more beacon signals;
receive the marker signal and the augmented reality content from the augmented reality content management server;
scan the geographical area using the camera;
identify the replacement marker within the geographical area; and
output the augmented reality content associated with the amusement park attraction on the display by overlaying the augmented reality content on a real-world environment of the amusement park attraction in response to identifying the replacement marker.

2. The augmented reality system of claim 1, wherein the augmented reality content management server is configured to receive the one or more beacon-related signals from the augmented reality device, and to determine the geographical area of the augmented reality device based at least in part on the one or more beacon-related signals.

3. The augmented reality system of claim 1, wherein the augmented reality content management server is communicatively coupled to a geographical area database that is configured to store information relating a plurality of geographical areas to a plurality of beacons.

4. The augmented reality system of claim 1, wherein the augmented reality content management server is configured to determine the replacement marker based at least in part on the geographical area of the augmented reality device.

5. The augmented reality system of claim 1, wherein the augmented reality content management server is communicatively coupled to a marker database that is configured to store information relating a plurality of markers to a plurality of geographical areas.

6. The augmented reality system of claim 1, wherein the augmented reality content management server is configured to determine the augmented reality content based at least in part on the replacement marker.

7. The augmented reality system of claim 6, wherein the augmented reality content management server is communicatively coupled to a content database that is configured to store information relating a plurality of augmented reality content to the plurality of markers.

8. The augmented reality system of claim 1, wherein the augmented reality content management server is configured to replace the marker with the replacement marker by associating the augmented reality content with the replacement marker in a content database configured to store information relating a plurality of augmented reality content to the plurality of markers.

9. The augmented reality system of claim 1, wherein the augmented reality content management server is configured to determine the replacement marker by:
  determining an available sensor located within the geographical area; and
  instructing the available sensor to determine the replacement marker within the geographical area.

10. The augmented reality system of claim 9, wherein the available sensor is separate from the augmented reality device.

11. An augmented reality device comprising:
  a camera;
  a display;
  and
  a controller comprising one or more processors and one or more memory devices, wherein the one or more processors, when executing instructions stored on the one or more memory devices, are configured to:
  receive one or more beacon signals from one or more beacons within a geographical area;
  send one or more beacon-related signals to an augmented reality content management server based at least in part on the one or more beacon signals, wherein the augmented reality content management server is configured to:
    store augmented reality content associated with an amusement park attraction;
    receive an indication to update a marker;
    in response to receiving the indication to update the marker, determine a replacement marker from a plurality of markers in the geographical area by determining an available sensor located within the geographical area and instructing the available sensor to determine the replacement marker within the geographical area; and
    send a marker signal indicative of the replacement marker and the augmented reality content to the augmented reality device;
  receive the marker signal indicative of the replacement marker and the augmented reality content from the augmented reality content management server based at least in part on the one or more beacon-related signals;
  scan the geographical area, and identify the replacement marker within the geographical area using the camera; and
  output the augmented reality content associated with the amusement park attraction on the display by overlaying the augmented reality content on a real-world environment of the amusement park attraction in response to identifying the replacement marker.

12. The augmented reality device of claim 11, wherein the one or more processors are configured to determine whether there is sufficient storage space in the one or more memory devices to store the marker signal and the augmented reality content in the one or more memory devices, and to store the marker signal and the augmented reality content in the one or more memory devices in response to determining that there is sufficient storage space in the one or more memory devices.

13. The augmented reality device of claim 11, wherein the one or more processors are configured to delete previously stored marker information associated with a second geographical area that is furthest away from the geographical area of the augmented reality device, to delete previously stored augmented reality content associated with the second geographical area, or both, in response to determining that there is not sufficient storage space in the one or more memory devices.

14. The augmented reality device of claim 11, wherein the one or more processors are configured to delete a least frequently used previously stored marker signal, a least frequently used previously stored augmented reality content, or both, in response to determining that there is not sufficient storage space in the memory.

15. The augmented reality device of claim 11, wherein the augmented reality content management server is configured to select the replacement marker from the plurality of markers in the geographical area without user interaction.

16. A tangible, non-transitory, computer-readable medium, comprising instructions for dynamically loading area-based augmented reality content, wherein the instructions, when executed by one or more processors, cause the one or more processors to:
  receive a set of beacon signals from a set of beacons within a geographical area;
  send a set of beacon-related signals indicative of the set of beacon signals to an augmented reality content management server, wherein the augmented reality content management server is configured to:
    store augmented reality content associated with an amusement park attraction;
    receive an indication to update a marker;
    in response to receiving the indication to update the marker, autonomously select a replacement marker from a plurality of markers in the geographical area; and
    send a marker signal indicative of the replacement marker and the augmented reality content to an augmented reality device;
  receive the marker signal indicative of the replacement marker within the geographical area and the augmented reality content associated with the replacement marker from the augmented reality content management server based at least in part on the set of beacon-related signals, wherein the augmented reality content is associated with an amusement park attraction;

scan the geographical area for the replacement marker; and output the augmented reality content associated with the replacement marker and the amusement park attraction by overlaying the augmented reality content onto a real-world environment of the amusement park attraction in response to identifying the replacement marker within the geographical area.

17. The tangible, non-transitory, computer-readable medium of claim 16, comprising instructions that cause the one or more processors to determine whether there is sufficient storage space to store the marker signal indicative of the replacement marker and the augmented reality content associated with the replacement marker.

18. The tangible, non-transitory, computer-readable medium of claim 16, comprising instructions that cause the one or more processors to store the marker signal indicative of the replacement marker and the augmented reality content associated with the replacement marker in response to determining that there is sufficient storage space.

19. The tangible, non-transitory, computer-readable medium of claim 16, comprising instructions that cause the one or more processors to delete previously stored marker information associated with a second geographical area, to delete previously stored augmented reality content associated with the second geographical area, or both.

20. The tangible, non-transitory, computer-readable medium of claim 19, comprising instructions that cause the one or more processors to determine whether there is sufficient storage space to store the marker signal indicative of the replacement marker and the augmented reality content associated with the replacement marker after deleting the previously stored marker information associated with the second geographical area, after deleting the previously stored augmented reality content associated with the second geographical area, or both, and to store the marker signal indicative of the replacement marker and the augmented reality content associated with the replacement marker in response to determining that there is sufficient storage space.

* * * * *